US012671685B2

(12) United States Patent
Velasco et al.

(10) Patent No.: US 12,671,685 B2
(45) Date of Patent: Jun. 30, 2026

(54) CONTEXT-BASED CONTENT AUTHORIZATION

(71) Applicant: International Business Machines Corporation, Armonk, NY (US)

(72) Inventors: Marc Velasco, Orange, CA (US); Rafael Fernandez, Durham, NC (US); James Hutchison, Tonawanda, NY (US); Kassandra Aysha Perez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/112,859

(22) Filed: Feb. 22, 2023

(65) Prior Publication Data

US 2024/0283783 A1      Aug. 22, 2024

(51) Int. Cl.
*H04L 29/06*          (2006.01)
*H04L 9/40*          (2022.01)

(52) U.S. Cl.
CPC .......... *H04L 63/083* (2013.01); *H04L 63/107* (2013.01)

(58) Field of Classification Search
CPC . H04L 63/083; H04L 63/107; H04L 63/0815; H04L 63/102; H04L 63/105
See application file for complete search history.

(56) References Cited

U.S. PATENT DOCUMENTS 9,349,016 B1    5/2016  Brisebois et al.
10,057,289 B2   8/2018  Abuelsaad et al.
10,104,121 B2 * 10/2018  Xie ..................... H04L 63/0815
10,324,746 B2   6/2019  Kumar et al.
10,803,173 B2   10/2020  Gunda
11,044,340 B2   6/2021  Kristiansson et al.
11,263,342 B2   3/2022  Indukuri et al.
2014/0096215 A1  4/2014  Hessler
2015/0012964 A1 * 1/2015  Xie ........................ H04L 63/20
                                                  726/1

(Continued)

OTHER PUBLICATIONS

Mostefaoui et al., A generic framework for context-based distributed authorizations, International and Interdisciplinary Conference on Modeling and Using Context, Jun. 23-25, 2003.

(Continued)

*Primary Examiner* — William A Corum, Jr.
(74) *Attorney, Agent, or Firm* — David K. Mattheis

(57) ABSTRACT

An embodiment includes extracting network layer information and application layer information from within a network packet. The embodiment determines a context of a network connection with a client device from which the network packet originated based at least in part on the network layer information and determines an identity of an end user with whom the network packet is associated based at least in part on the application layer information. The embodiment performs a sign-on process that authenticates the identified end user and authorizes, at a session level, the identified end user to access a particular resource of the network. The embodiment also performs a program-level authorization process that determines whether to provide program-level authorization to the identified end user based on a comparison of the context of the network connection with a context policy of the particular resource of the network.

14 Claims, 10 Drawing Sheets

(56) References Cited

U.S. PATENT DOCUMENTS

2015/0341391 A1    11/2015  Menon et al.
2017/0288987 A1*  10/2017  Pasupathy ........... H04L 63/0236
2017/0339109 A1*  11/2017  Zeng .................... H04L 63/166

OTHER PUBLICATIONS

Google, A Safer Way to sign in to all of your online accounts, 2023, https://safety.google/authentication/.

* cited by examiner

*Fig. 6*

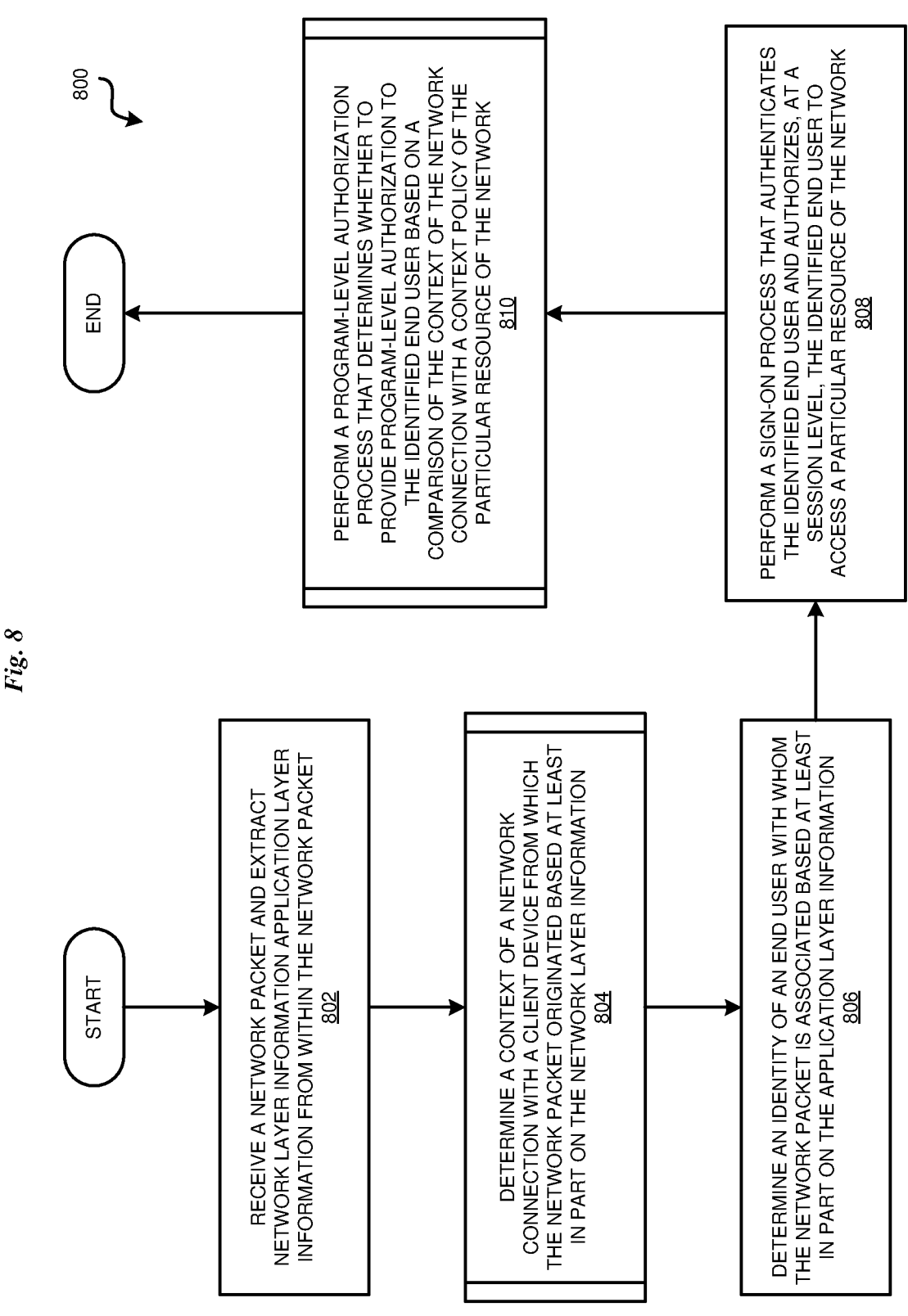

START

RECEIVE A NETWORK PACKET AND EXTRACT NETWORK LAYER INFORMATION APPLICATION LAYER INFORMATION FROM WITHIN THE NETWORK PACKET
802

DETERMINE A CONTEXT OF A NETWORK CONNECTION WITH A CLIENT DEVICE FROM WHICH THE NETWORK PACKET ORIGINATED BASED AT LEAST IN PART ON THE NETWORK LAYER INFORMATION
804

DETERMINE AN IDENTITY OF AN END USER WITH WHOM THE NETWORK PACKET IS ASSOCIATED BASED AT LEAST IN PART ON THE APPLICATION LAYER INFORMATION
806

PERFORM A SIGN-ON PROCESS THAT AUTHENTICATES THE IDENTIFIED END USER AND AUTHORIZES, AT A SESSION LEVEL, THE IDENTIFIED END USER TO ACCESS A PARTICULAR RESOURCE OF THE NETWORK
808

PERFORM A PROGRAM-LEVEL AUTHORIZATION PROCESS THAT DETERMINES WHETHER TO PROVIDE PROGRAM-LEVEL AUTHORIZATION TO THE IDENTIFIED END USER BASED ON A COMPARISON OF THE CONTEXT OF THE NETWORK CONNECTION WITH A CONTEXT POLICY OF THE PARTICULAR RESOURCE OF THE NETWORK
810

END

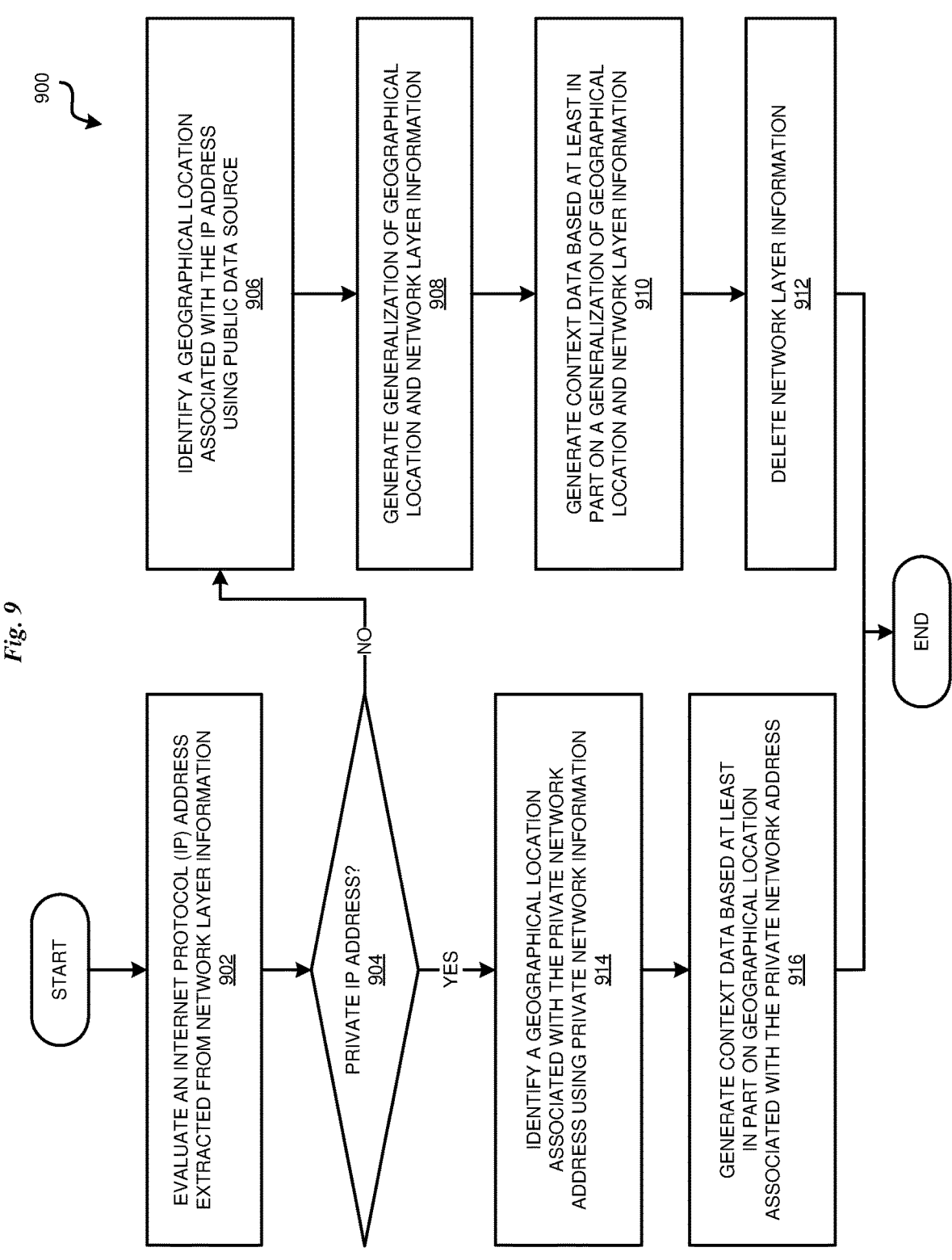

START

EVALUATE AN INTERNET PROTOCOL (IP) ADDRESS EXTRACTED FROM NETWORK LAYER INFORMATION
902

PRIVATE IP ADDRESS?
904

NO

YES

IDENTIFY A GEOGRAPHICAL LOCATION ASSOCIATED WITH THE IP ADDRESS USING PUBLIC DATA SOURCE
906

GENERATE GENERALIZATION OF GEOGRAPHICAL LOCATION AND NETWORK LAYER INFORMATION
908

GENERATE CONTEXT DATA BASED AT LEAST IN PART ON A GENERALIZATION OF GEOGRAPHICAL LOCATION AND NETWORK LAYER INFORMATION
910

DELETE NETWORK LAYER INFORMATION
912

IDENTIFY A GEOGRAPHICAL LOCATION ASSOCIATED WITH THE PRIVATE NETWORK ADDRESS USING PRIVATE NETWORK INFORMATION
914

GENERATE CONTEXT DATA BASED AT LEAST IN PART ON GEOGRAPHICAL LOCATION ASSOCIATED WITH THE PRIVATE NETWORK ADDRESS
916

END

CONTEXT-BASED CONTENT AUTHORIZATION

BACKGROUND

The present invention relates generally to security of computer systems. More particularly, the present invention relates to a method, system, and computer program for context-based content authorization.

Identity and access management (IAM) controls user access to a network, including authenticating the user's identity and verifying that the user request is within the user's access rights. IAM typically authenticates users by checking the validity of login credentials, e.g., username and password, provided by the user. If the IAM system authenticates the user, the IAM system will grant the user access to requested resources on the network, but there will usually be limits to that access. The user's limited abilities are referred to as permissions or privileges, which are governed by privileged access management (PAM).

PAM provides a framework for network administrators to define user roles that correspond to different levels of access control according to administrator policies. PAM can secure network resources and facilitate compliance with network policies by enforcing Role Based Access Control (RBAC). RBAC uses a predefined set of rules to enforce privileges granted to users grouped into different roles. PAM assigns privileges to each role and assigns a role to each user. Thus, rather than configure each user's privileges individually, PAM can configure privileges assigned to a role, which will equally affect all users assigned to that role.

SUMMARY

The illustrative embodiments provide for context-based content authorization. An embodiment includes extracting, by a network module, from a network packet received by the network module, network layer information from within the network packet and application layer information from within the network packet. The embodiment also includes determining a context of a network connection with a client device from which the network packet originated based at least in part on the network layer information. The embodiment also includes determining an identity of an end user with whom the network packet is associated based at least in part on the application layer information. The embodiment also includes performing a sign-on process that authenticates the identified end user and authorizes, at a session level, the identified end user to access a particular resource of the network. The embodiment also includes performing a program-level authorization process that determines whether to provide program-level authorization to the identified end user based on a comparison of the context of the network connection with a context policy of the particular resource of the network. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 6 depicts a block diagram of an example development environment in accordance with an illustrative embodiment;

FIG. 8 depicts a flowchart of an example process for context-based content authorization in accordance with an illustrative embodiment;

FIG. 9 depicts a flowchart of an example process for determining a context of a network connection in accordance with an illustrative embodiment.

DETAILED DESCRIPTION

Figure 1:
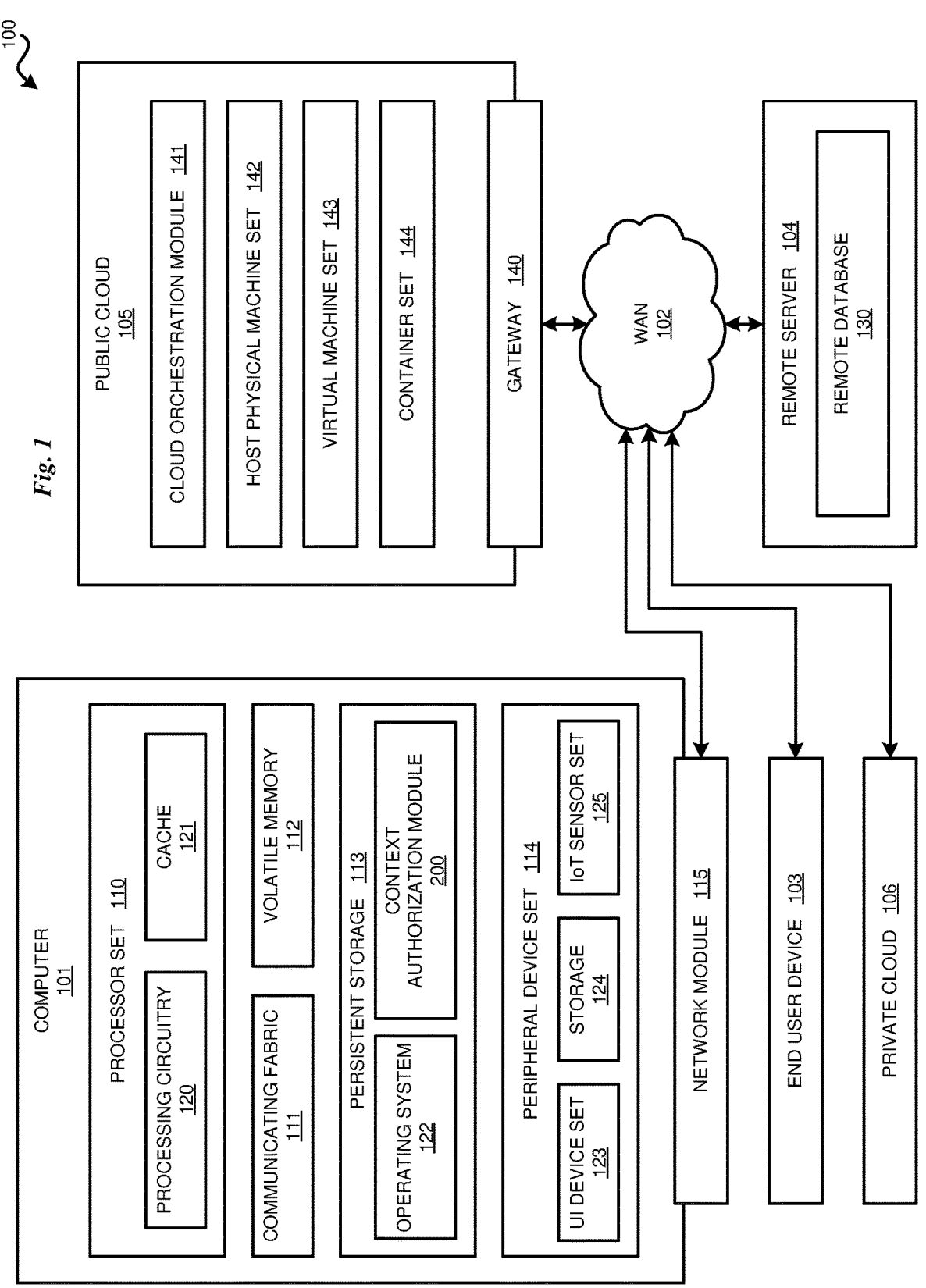
FIG. 1 depicts a block diagram of a computing environment in accordance with an illustrative embodiment.

While access and privilege management systems are helpful in providing network security, they remain vulnerable to unauthorized users who discover valid credentials and to legitimate users who have malicious intent. For example, many current access and privilege management systems are Role Based Access Control (RBAC) systems. RBAC uses a predefined set of rules to enforce privileges granted to users grouped into different roles. A problem with current systems is that they grant the same access and privileges to a user upon authenticating the user's login credentials regardless of other factors. As a result, current systems do not guard against unauthorized users who gain access using someone else's credentials.

The illustrative embodiments recognize that there is a need to improve network security and authorization systems by providing a context-based content authorization system that can detect potentially malicious or unauthorized users accessing a network. For example, a context-based content authorization system can decide whether to grant or deny access to a resource based on packet data rather than user-supplied credentials. Thus, while a bad actor may have gained access and established an authenticated session using stolen credentials, disclosed embodiments may still prevent the bad actor from accessing a resource by recognizing that context information regarding the bad actor's network connection does not match what would be expected from the user associated with the credentials or what is otherwise required by a context policy of that resource.

A network context refers to attributes of a network connection between a client device and a server or cloud-based system utilizing an embodiment of the disclosed context-based content authorization process or system, where the attributes include any data present in a network packet, such as network layer information and/or application layer information, and/or information extrapolated or determined based on network packet information, such as a geolocation of the client device determined based on the IP address or a device type determined based on the MAC address of the client device.

A resource, also referred to as a network resource or server resource, may be any type of file, application, or service that is made available to a remote user or multiple remote users, where a remote user is a user connecting from a client device via a computer network. Non-limiting examples of resources may include files, such as documents, spreadsheets, and presentations, software such as an integrated development environment (IDE) or document management system, or services, such as an application programming interface (API)-accessible web or cloud based service.

In exemplary embodiments, a session authentication module is configured to implement a login process for remote devices, such as a remote client device, such that, once configured, the session authentication module manages login idiosyncrasies so that authorized remote users may access protected resources subject to further authorization processing performed by a context authorization module. Thus, in exemplary embodiments, prior to permitting use of resources, the session authentication module requests and authenticates user access credentials.

According to some embodiments, an authorization process receives an application layer packet (i.e., Open Systems Interconnection (OSI) application layer (layer 7)). The process extracts application layer information from within the packet, and determines an application type with which the application layer packet is associated. Based on the application type, one or more information fields can be retrieved/extracted from the application layer information contained within the packet. In some embodiments, the information fields retrieved/extracted are individually or collectively indicative of an identity of an end user with which the application layer packet is associated. In some embodiments, the process determines the identity of the end user based on the retrieved information fields and then uses a security rule database, which is operatively connected thereto, to identify one or more applicable security rules based on the determined application type and the identity of the end user. According to some embodiments, the process applies the one or more applicable security rules to the application layer packet. In some embodiments, the process uses the determined identity as a comparison to received credentials to verify the authenticity of the credentials as part of the authentication process.

According to some embodiments, the process also receives a network layer packet (i.e., Open Systems Interconnection (OSI) network layer (layer 3)). The process extracts network layer information from within the packet, and determines a context of the network connection with the client device. In some embodiments, the context comprises context information extracted directly from the network layer information and/or information extrapolated or determined based on network layer information, such as an IP address of the client device and/or a geographical location of the client device.

In some embodiments, particularly if the context information includes personal information, the process obfuscates or generalizes portions of the context information, for example by encrypting, modifying, and/or deleting portions of the context information. For example, in some embodiments, the process obfuscates a fourth octet of an IPV4 address and/or generalizes a geographical location of the client device to a geographical region (e.g., replacing a street address with the name of the state in which the street address is located), then uses the obfuscated and/or generalized information as context data and deletes the original more specific network layer information.

In some embodiments, the process determines whether the IP address is a private network address. In some such embodiments, if the process detects that the IP address is a private IP address, the process determines that the client device is connected via a private network. In some such embodiments, the process may access network information about the private network that maps IP addresses to physical locations, such as buildings, floors, or rooms, and determines the physical location of the client device using the private network address and the network information.

In some embodiments, the context information is also, or alternatively, extracted or based on information from the application layer and/or other OSI layer(s). For example, in some embodiments, the context information includes the identity of the end user using the client device and/or a group membership (e.g., user group, security group, etc.) of the end user using the client device.

In the illustrated embodiment, the process implements a program-level authorization process that determines whether to provide program-level authorization to an end user that has been authenticated and authorized to establish a communication session. The process performs the program-level authorization process based on a comparison of the context of the network connection with a context policy of a particular resource for which access has been requested via the client device. Thus, in some embodiments, the process performs the program-level authorization process on a resource by resource basis based on the context policy of each individual resource. In some embodiments, the resources may be arranged in resource groups where resources in a group share a context policy such that authorization to any resource in the group grants authorization to all resources in the resource group.

In some embodiments, when the process authenticates and authorizes the client device, the process establishes a communications session with the client device, which includes generating a session data structure that includes information about the communications session with the client device. In some embodiments, when the process authorizes the client device to access a particular resource, the process generates context authorization indicative of the client device being authorized to access the particular resource, and associates the context authorization with the session data structure.

In some embodiments, once the process authorizes the client device to access a particular resource, the process begins monitoring actions performed by the end user from the client device that affect the particular resource. In some embodiments, the process generates and stores log data that includes each action performed by the end user that affected the particular resource and further includes at least a portion of the context data, and may include additional data such as security policy data. For example, if the particular resource is updated by the end user via the client device, the process may generate a log entry such as "Updated by User A (Company Network)(Unrestricted Access)" along with a time and date and/or other desired information.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as an improved context authorization module 200 that performs context-based content authorization. In addition to context authorization module 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and context authorization module 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in context authorization module 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory

8

(RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in context authorization module 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
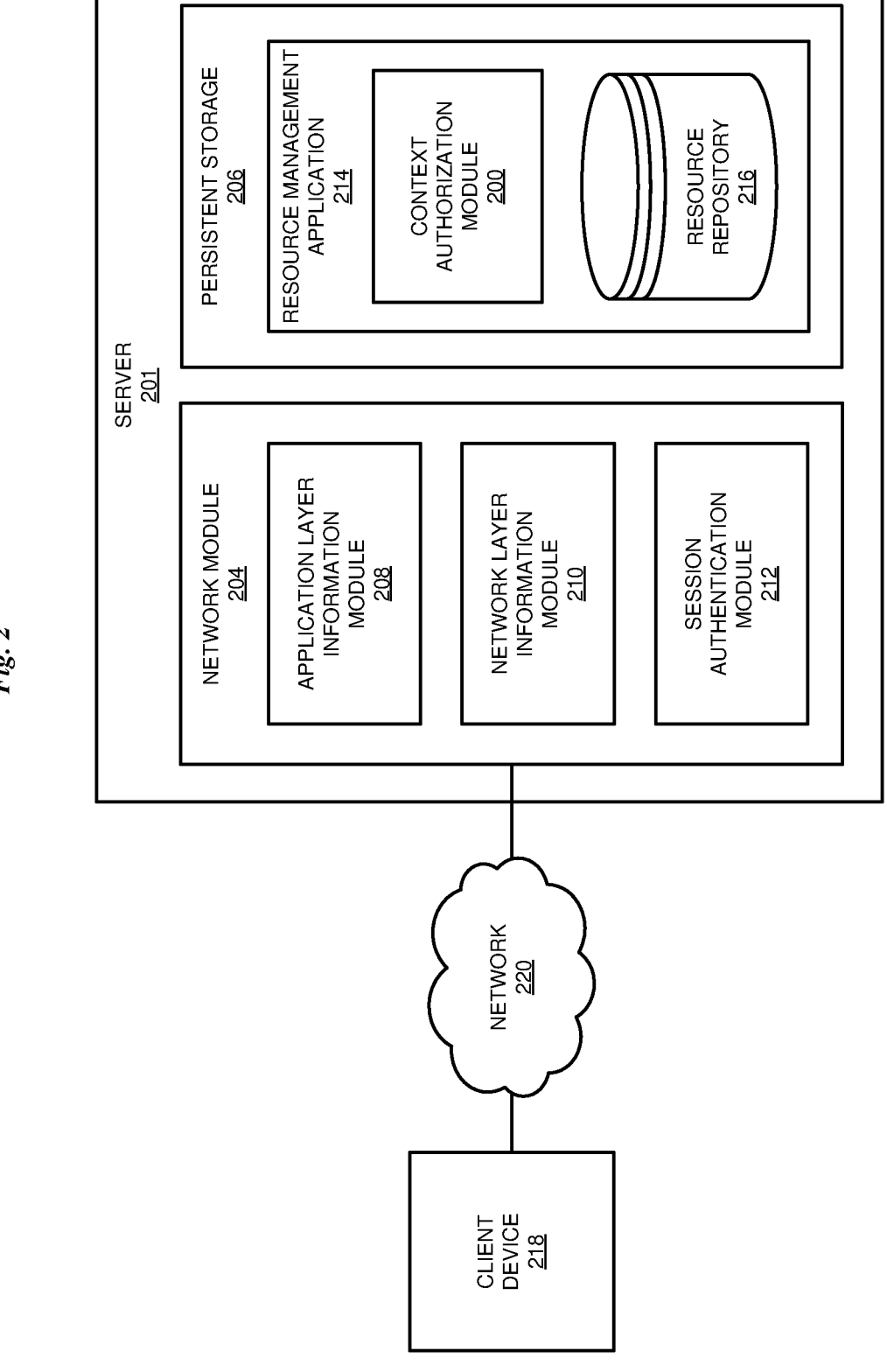
FIG. 2 depicts a block diagram of a server having a context authorization module in accordance with an illustrative embodiment.

With reference to FIG. 2, this figure depicts a block diagram of a server 201 having a context authorization module 200 in accordance with an illustrative embodiment. In a particular embodiment, the server 201 is an example of the computer 101 of FIG. 1.

In the illustrated embodiment, the server 201 comprises a network module 204, which in some embodiments is an example of the network module 115 of FIG. 1, and persistent storage 206, which in some embodiments is an example of persistent storage 113 of FIG. 1. The network module 204 includes an application layer information module 208, a network layer information module 210, and a session authentication module 212. The persistent storage 206 includes a resource management application 214, which includes an example of the context authorization module 200 of FIG. 1 and further includes a resource repository 216. In alternative embodiments, the server 201 can include some or all of the functionality described herein but grouped differently into one or more systems or modules. In some embodiments, the functionality described herein is distributed among a plurality of systems, which can include combinations of software and/or hardware-based systems, for example Application-Specific Integrated Circuits (ASICs), computer programs, or smart phone applications.

The block diagram of FIG. 2 illustrates an exemplary network architecture conceptually showing a network environment in which context authorization and a flow of network traffic packets may take place between a client device 218 and the server 201 across a network 220. The client device 218 may comprise a laptop, personal computer, smart phone, tablet computer, web terminal, or other computing device operatively coupled to the server 201 through the network 220. The network 220 comprises a public and/or private network.

In the illustrated embodiment, the session authentication module 212 of the network module 204 is configured to implement a login process for remote devices, such as the client device 218, such that, once configured, the session authentication module 212 manages login idiosyncrasies for the server 201 so that authorized remote users may access server resources, such as those stored in resource repository 216 and managed by the resource management application 214, subject to further authorization processing performed by the context authorization module 200. Thus, the network module 204 comprises login information of users to facilitate managing sessions and access rights for the server 201, and in some embodiments also allows the server 201 to act as a central network and security manager for implementing network policies and access to other computing devices. In some embodiments, the session authentication module 212 is configured to authenticate each user and apply security rules for each user based on login and user characteristics.

Thus, in the illustrated embodiment, prior to permitting use of server resources, the session authentication module 212 requests and authenticates user access credentials. In some embodiments, the network module 204 stores user access credentials of multiple different users in a local guarded memory or database. The session authentication module 212 compares received user access credentials with stored user access credentials. If there is a match, the session authentication module 212 may be authenticated. Otherwise, the remote user might not be authenticated and prevented from using the server resources. The user access credentials may be in the form of a username and password, public key infrastructure (PKI) certificate, or the like.

According to some embodiments, the network module 204 is configured to receive an application layer packet (i.e., Open Systems Interconnection (OSI) application layer (layer 7)). The application layer information module 208 is configured to extract application layer information from within the packet, and determine an application type with which the application layer packet is associated. Based on the application type, one or more information fields can be retrieved/extracted from the application layer information contained within the packet. In some embodiments, the information fields retrieved/extracted are individually or collectively indicative of an identity of an end user with which the application layer packet is associated. In some embodiments, the network module 204 determines the identity of the end user based on the retrieved information fields and then uses a security rule database, which is operatively connected thereto, to identify one or more applicable security rules based on the determined application type and the identity of the end user. According to some embodiments, the network module 204 applies the one or more applicable security rules to the application layer packet. In some embodiments, the session authentication module 212 uses the determined identity as a comparison to received credentials to verify the authenticity of the credentials as part of the authentication process.

According to some embodiments, the network module 204 is also configured to receive a network layer packet (i.e., Open Systems Interconnection (OSI) network layer (layer 3)). The network layer information module 210 is configured to extract network layer information from within the packet, and determine a context of the network connection with the client device 218. In some embodiments, the context comprises context information extracted directly from the network layer information and/or information extrapolated or determined based on network layer information, such as an IP address of the client device 218 and/or a geographical location of the client device 218.

In some embodiments, particularly if the context information includes personal information, the network layer information module 210 obfuscates or generalizes portions of the context information, for example by encrypting, modifying, and/or deleting portions of the context information. For example, in some embodiments, the network layer information module 210 obfuscates a fourth octet of an IPV4 address and/or generalizes a geographical location of the client device 218 to a geographical region (e.g., replacing a street address with the name of the state in which the street address is located), then uses the obfuscated and/or generalized information as context data and deletes the original more specific network layer information. In some embodiments, the network layer information module 210 determines whether the IP address is a private network address. In some such embodiments, if the network layer information module 210 detects that the IP address is a private IP address, the network layer information module 210 determines that the client device 218 is connected via a private network. In some such embodiments, the network layer information module 210 may access network information about the private network that maps IP addresses to physical locations, such as buildings, floors, or rooms, and determines the physical location of the client device 218 using the private network address and the network information.

In some embodiments, the context information is also, or alternatively, extracted or based on information from the application layer and/or other OSI layer(s). For example, in some embodiments, the context information includes the identity of the end user using the client device 218 and/or a group membership (e.g., user group, security group, etc.) of the end user using the client device 218.

In the illustrated embodiment, the context authorization module 200 is configured to implement a program-level authorization process that determines whether to provide program-level authorization to an end user that has been authenticated and authorized to have access to the server 201 by the session authentication module 212. The context authorization module 200 is configured to perform the program-level authorization process based on a comparison of the context of the network connection with a context policy of a particular resource, such as a resource of the resource repository 216 managed by the resource management application 214. Thus, in some embodiments, the context authorization module 200 performs the program-level authorization process on a resource by resource basis based on the context policy of each individual resource. In some embodiments, the resources may be arranged in resource groups where resources in a group share a context policy such that authorization to any resource in the group grants authorization to all resources in the resource group.

In some embodiments, when session authentication module 212 authenticates and authorizes the client device 218, the session authentication module 212 establishes a communications session with the client device 218, which includes generating a session data structure that includes information about the communications session with the client device 218. In some embodiments, when the context authorization module 200 authorizes the client device 218 to access a particular resource, the context authorization module 200 generates context authorization indicative of the client device 218 being authorized to access the particular resource, and associates the context authorization with the session data structure.

In some embodiments, once the context authorization module 200 authorizes the client device 218 to access a particular resource, the context authorization module 200 begins monitoring actions performed by the end user from the client device 218 that affect the particular resource. In some embodiments, the context authorization module 200 generates and stores log data that includes each action performed by the end user that affected the particular resource and further includes at least a portion of the context data, and may include additional data such as security policy data. For example, if the particular resource is updated by the end user via the client device 218, the context authorization module 200 may generate a log entry such as "Updated by User A (Company Network)(Unrestricted Access)" along with a time and date and/or other desired information.

Figure 3:
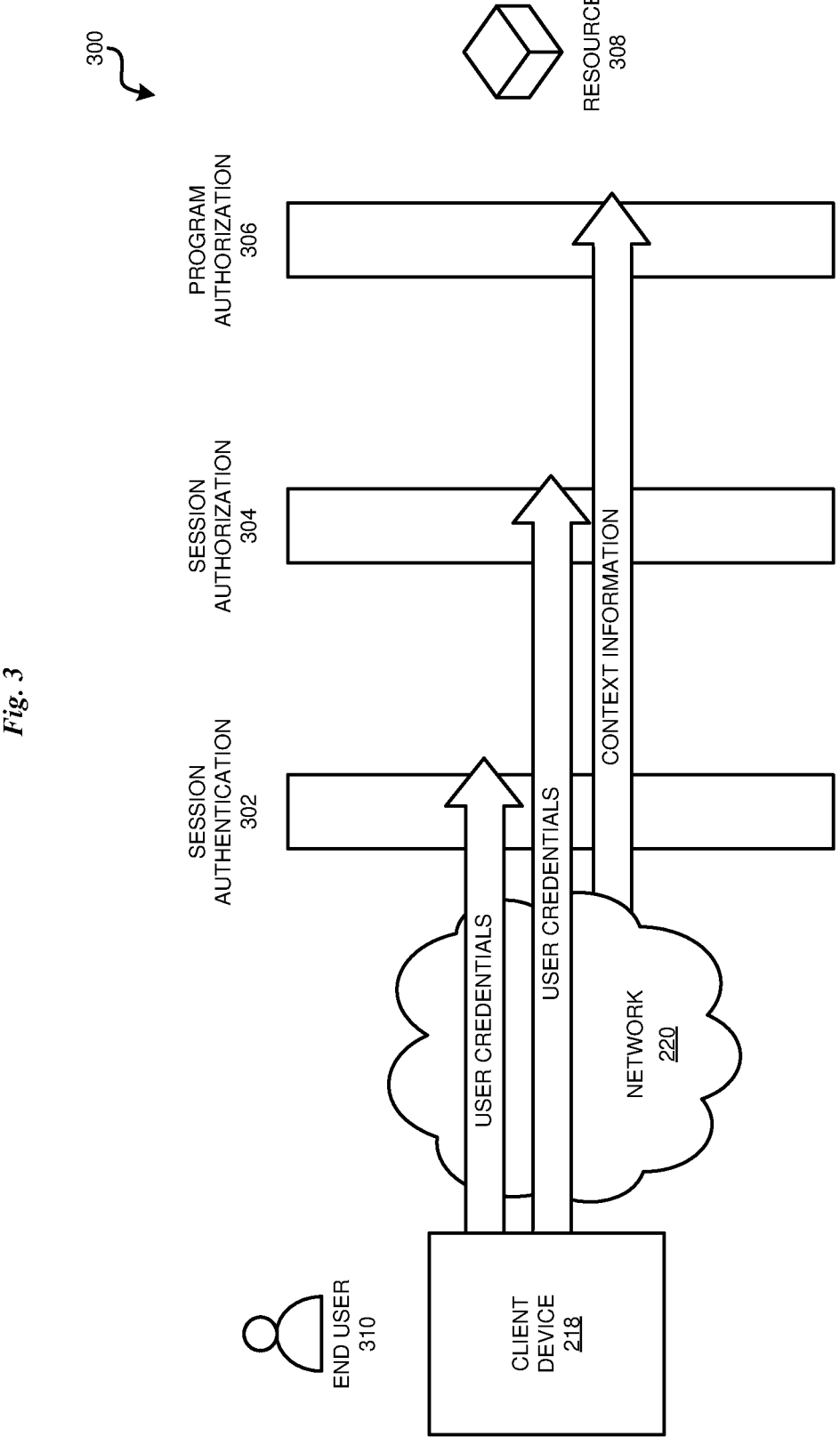
FIG. 3 depicts a high-level block diagram illustrating an authorization process in accordance with an illustrative embodiment.

With reference to FIG. 3, this figure depicts a high-level block diagram illustrating an authorization process 300 in accordance with an illustrative embodiment. In a particular embodiment, the example authorization process 300 is an example of the authentication and authorization processes performed by the session authentication module 212 and context authorization module 200 of FIG. 2 described above.

In the illustrated embodiment, an end user 310 seeking access to a resource 308 attempts to access the resource 308 using a client device 218 to connect to the resource 308 via a network 220. The client device 218 initiates a network connection to access the resource 308 and is initially met with a session authentication 302 and session authorization 304 challenge in order to establish a communication session to access the resource 308. Typically the end user 310 will provide user credentials to establish the communication session. However, before the client device 218 is able to access the resource 308, a program authorization 306 process is also performed that is based on context information extracted from network packets rather than from credentials provided by the end user 310. The program authorization 306 determines whether the context information is satisfactory for granting authorization to access the resource 308.

Figure 4:
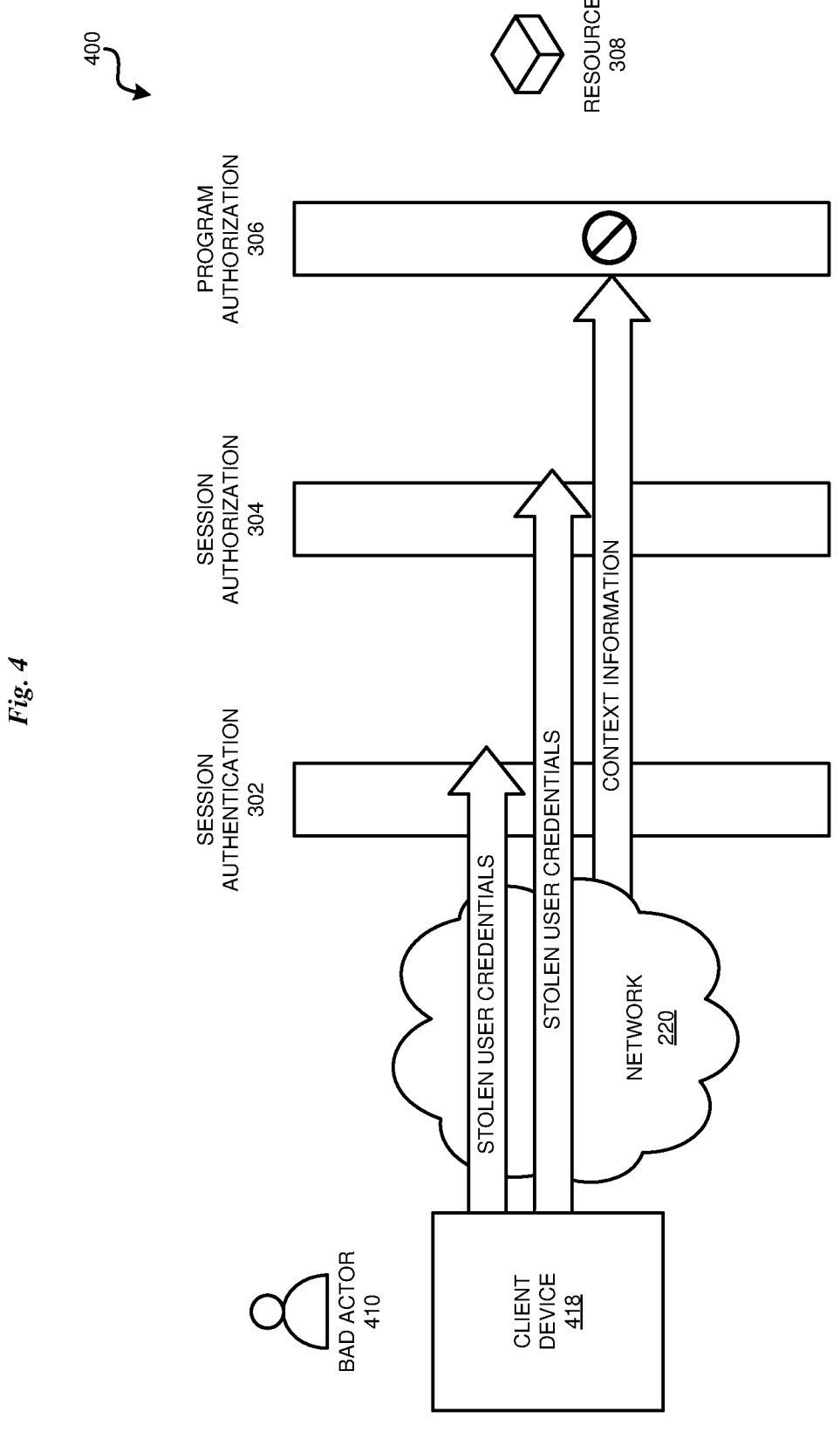
FIG. 4 depicts a high-level block diagram illustrating an authorization process in accordance with an illustrative embodiment.

With reference to FIG. 4, this figure depicts a high-level block diagram illustrating an authorization process 400 in accordance with an illustrative embodiment. In a particular embodiment, the example authorization process 400 shows a variation of the authorization process 300 where a bad actor 410 attempts to access the resource 308 using stolen user credentials.

In the illustrated embodiment, the bad actor 410 seeking access to the resource 308 attempts to access the resource 308 using a client device 418 to connect to the resource 308 via a network 220. The client device 418 initiates a network connection to access the resource 308 and is initially met with the session authentication 302 and session authorization 304 challenges in order to establish a communication session to access the resource 308. Here, the bad actor 410 is able to gain access using the stolen user credentials. However, before the client device 418 is able to access the resource 308, the program authorization 306 process is performed that is based on context information extracted from network packets rather than from the stolen credentials provided by the bad actor 410. The program authorization 306 determines that the context includes unfamiliar information or information that is otherwise unsatisfactory for granting authorization to access the resource 308. Thus, despite having access to the stolen user credentials, the bad actor 410 is prevented from accessing the resource 308.

Figure 5:
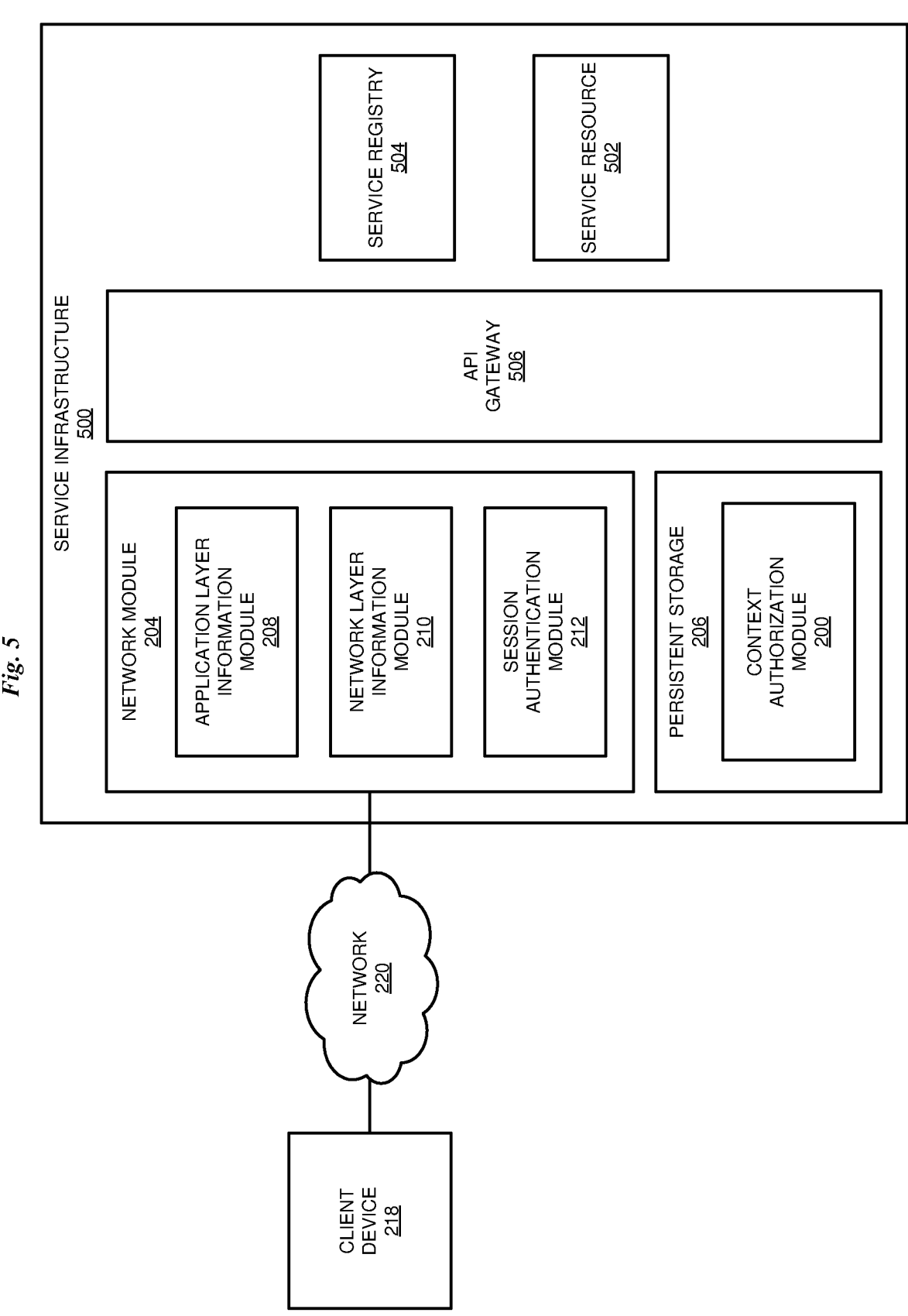
FIG. 5 depicts a block diagram of an example service infrastructure in accordance with an illustrative embodiment.

With reference to FIG. 5, this figure depicts a block diagram of an example service infrastructure 500 in accordance with an illustrative embodiment. In the illustrated embodiment, the service infrastructure 500 includes a service resource 502, which is representative of any type of network or cloud based service that is accessible through an application programming interface (API). The embodiment shown in FIG. 5 is similar to the embodiment shown in FIG. 2 except for differences described herein.

In the illustrated embodiment, the service infrastructure 500 provides services and service instances from the service resource 502. The client device 218 communicates with service infrastructure 500 via an API gateway 506. In various embodiments, service infrastructure 500 and its associated service resource 502 serve multiple users and multiple tenants. A tenant is a group of users (e.g., a company) who share a common access with specific privileges to the software instance. Service infrastructure 500 ensures that tenant specific data is isolated from other tenants.

In the illustrated embodiment, service infrastructure 500 includes a service registry 504. In some embodiments, the service resource 502 is a virtual machine and the service registry 504 looks up service instances of service resource 502 in response to a service lookup request such as one from API gateway 506 in response to a service request from the client device 218. In some embodiments, service registry 504 maintains information about the status or health of each service instance including performance information associated each of the service instances. In some such embodiments, such information may include various types of performance characteristics of a given service instance (e.g., cache metrics, etc.) and records of updates.

In some embodiments, the client device 218 connects with API gateway 506 via any suitable network or combination of networks such as the Internet, etc. and uses any suitable communication protocols such as Wi-Fi, Bluetooth, etc. Service infrastructure 500 may be built on the basis of cloud computing. API gateway 506 provides access to client applications like the service resource 502. API gateway 506 receives service requests issued by client applications and creates service lookup requests based on service requests. As a non-limiting example, in an embodiment, the client device 218 executes a routine to initiate interaction with the service resource 502. For instance, in some embodiments, a user accesses the alert triage module 200 directly using a command line or GUI. Also, in some embodiments, the user accesses the service resource 502 indirectly through the use of a web application that interacts with the service resource 502 via the API gateway 506.

In the illustrated embodiment, the service infrastructure 500 comprises the network module 204 of FIG. 2 that includes the application layer information module 208, the network layer information module 210, and the session authentication module 212. The service infrastructure 500 also comprises the persistent storage 206 of FIG. 2 that includes a context authorization module 200. In FIG. 5, the API gateway 506, service resource 502, and service registry 504 collectively serve as an example of a resource, such as resource 308 of FIGS. 3 and 4. Thus, to access the API gateway 506, service resource 502, and service registry 504, the client device 218 is first subject to the login process by the session authentication module 212, followed by further authorization processing performed by the context authorization module 200 as described above.

Figure 6:
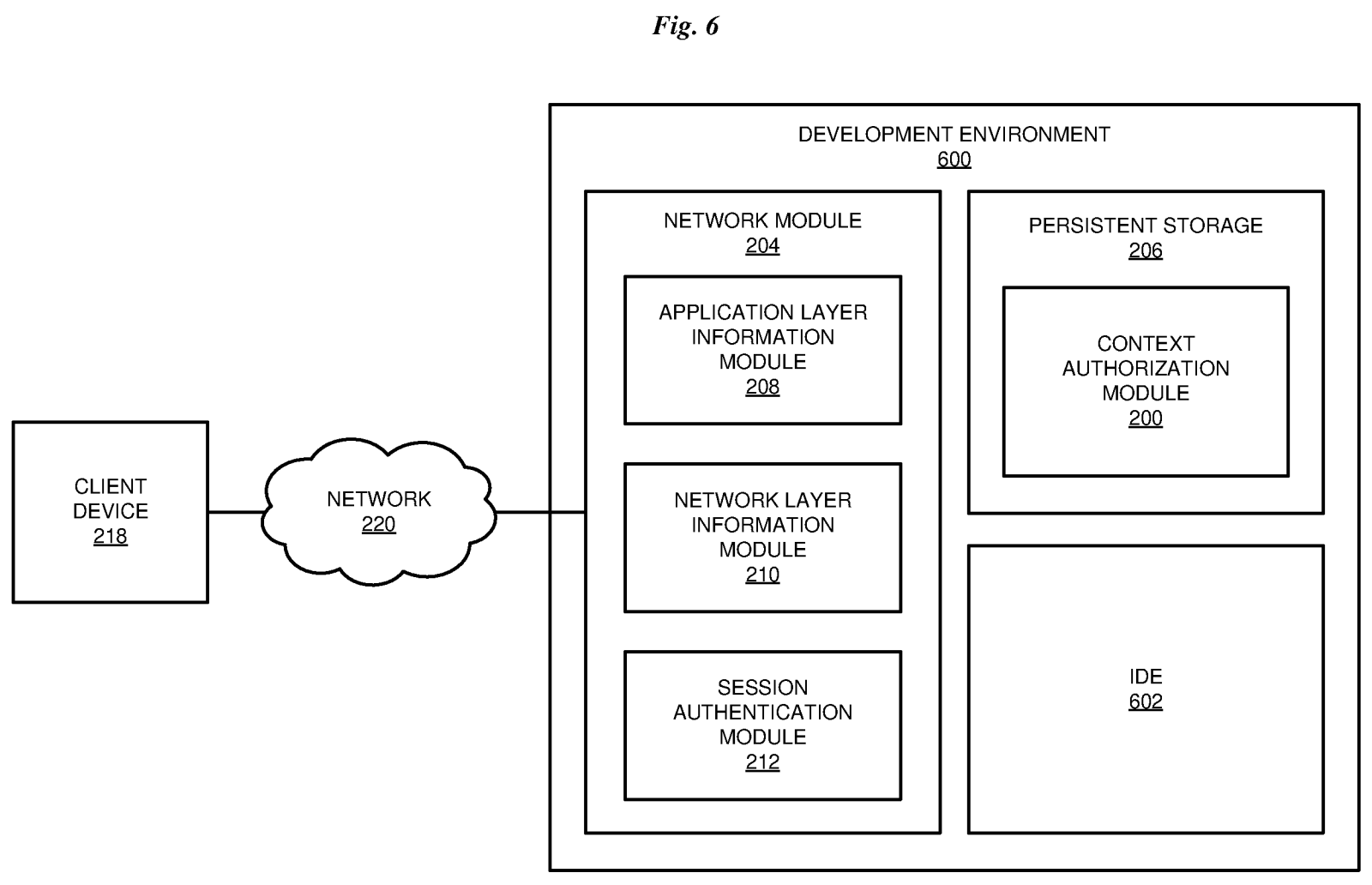

With reference to FIG. 6, this figure depicts a block diagram of an example development environment 600 in accordance with an illustrative embodiment. In the illustrated embodiment, the development environment 600 includes an integrated development environment (IDE) 602, which is representative of any type of IDE that is remotely accessible via a network. The embodiment shown in FIG. 6 is similar to the embodiment shown in FIG. 2 except for differences described herein.

In the illustrated embodiment, the development environment 600 comprises the network module 204 of FIG. 2 that includes the application layer information module 208, the network layer information module 210, and the session authentication module 212. The development environment 600 also comprises the persistent storage 206 of FIG. 2 that includes a context authorization module 200. In FIG. 6, the IDE 602 serves as an example of a resource, such as resource 308 of FIGS. 3 and 4. Thus, to access the IDE 602, the client device 218 is first subject to the login process by the session authentication module 212, followed by further authorization processing performed by the context authorization module 200 as described above.

Figure 7:
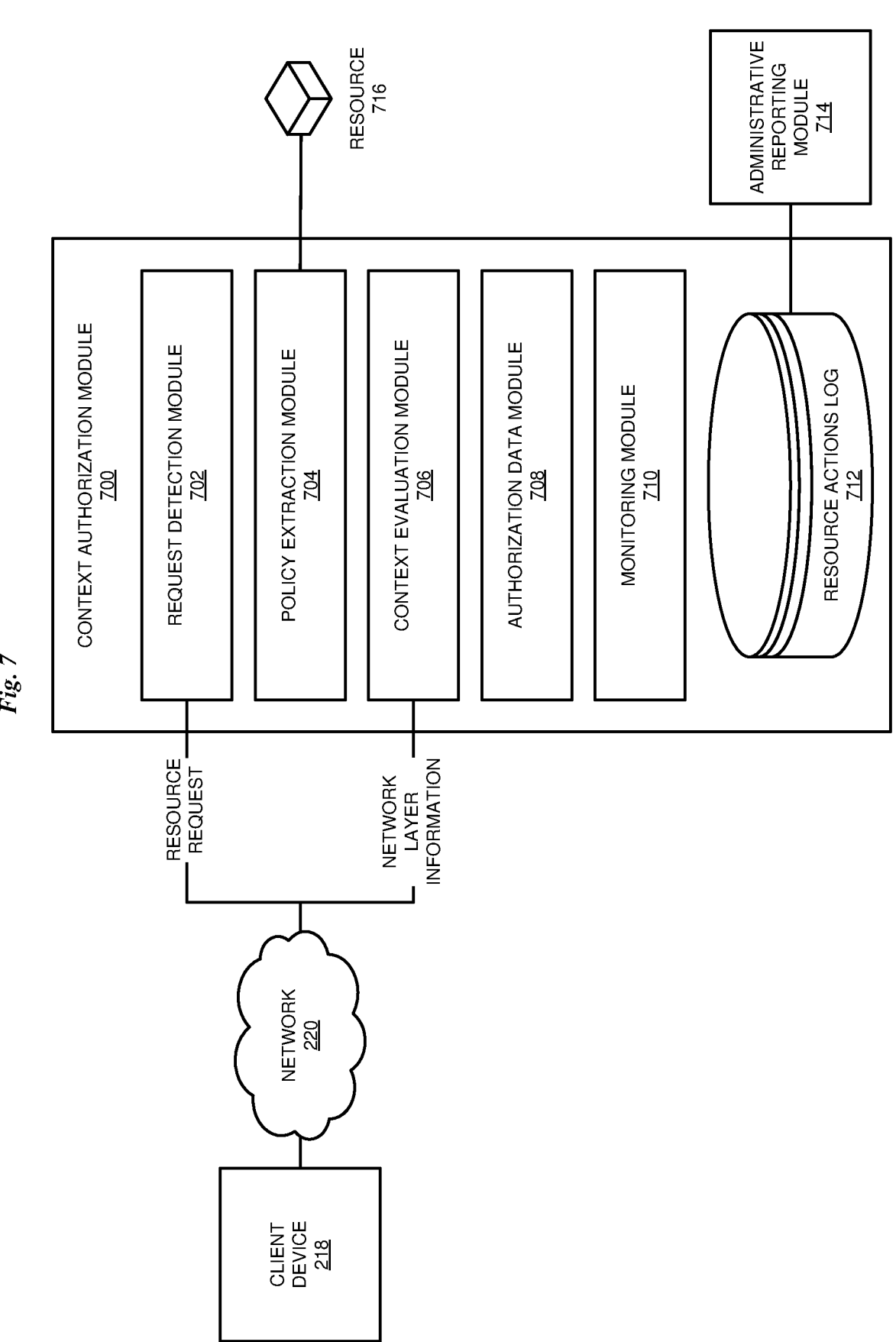
FIG. 7 depicts a block diagram of a context authorization module in accordance with an illustrative embodiment.

With reference to FIG. 7, this figure depicts a block diagram of a context authorization module 700 in accordance with an illustrative embodiment. In a particular embodiment, the context authorization module 700 is an example of context authorization module 200 of FIGS. 1, 2, 5, and 6.

In the illustrated embodiment, the context authorization module 200 comprises a request detection module 702, a policy extraction module 704, a context evaluation module 706, an authorization data module 708, a monitoring module 710, and a resource actions log 712. In alternative embodiments, the context authorization module 700 can include some or all of the functionality described herein but grouped differently into one or more systems or modules. In some embodiments, the functionality described herein is distributed among a plurality of systems, which can include combinations of software and/or hardware-based systems, for example Application-Specific Integrated Circuits (ASICs), computer programs, or smart phone applications.

The block diagram of FIG. 7 illustrates an exemplary network architecture conceptually showing a network environment in which context authorization and a flow of network traffic packets may take place between a client device 218 and the context authorization module 700 across a network 220.

According to some embodiments, the request detection module 702 is configured to receive a resource request while the context evaluation module 706 receives associated network layer information. The context evaluation module 706 is configured to determine a context of the network connection with the client device 218. In some embodiments, the context comprises context information extracted directly from the network layer information and/or information extrapolated or determined based on network layer information, such as an IP address of the client device 218 and/or a geographical location of the client device 218.

In the illustrated embodiment, the authorization data module 708 is configured to implement a program-level authorization process that determines whether to provide program-level authorization to an end user requesting access via the client device 218 to the resource 716. The authorization data module 708 is configured to perform the program-level authorization process based on a comparison of the context of the network connection with a context policy of the resource 716. In the illustrated embodiment, the policy extraction module 704 is configured to extract the context policy of the resource 716 from metadata associated with the resource 716.

Thus, in some embodiments, the authorization data module 708 performs the program-level authorization process on a resource by resource basis based on the context policy of each individual resource. In some embodiments, the resources may be arranged in resource groups where resources in a group share a context policy such that authorization to any resource in the group grants authorization to all resources in the resource group. In some embodiments, when the authorization data module 708 authorizes the client device 218 to access the resource 716, the authorization data module 708 generates context authorization indicative of the client device 218 being authorized to access the resource 716.

In some embodiments, once the authorization data module 708 authorizes the client device 218 to access the resource 716, the monitoring module 710 begins monitoring actions performed by the end user from the client device 218 that affect the resource 716. In some embodiments, the monitoring module 710 generates and stores log data and stores the log data in the resource actions log 712. The log data that includes each action performed by the end user that affected the resource 716 and further includes at least a portion of the context data, and may include additional data such as security policy data. For example, if the particular resource is updated by the end user via the client device 218, the monitoring module 710 may generate a log entry such as "Updated by User A (Company Network)(Unrestricted Access)" along with a time and date and/or other desired information.

In the illustrated embodiment, the administrative reporting module 714 is configured to access log data stored in the resource actions log 712. The administrative reporting module 714 may be configured to generate reports on a periodic basis and/or on demand. The administrative reporting module 714 may be configured to generate reports that are standard and/or may provide users with the ability to define and create custom reports based on the log data in the resource actions log 712. For example, the administrative reporting module 714 may be configured to generate an activity report that shows a number of actions per resource for a specified time frame (e.g., day, week, month, etc.) and network context information associated with the user performing the logged actions. As another example, the administrative reporting module 714 may be configured to generate a user credential audit report that shows user sessions and associated network context information for each session. Such a report may be useful for identifying instances in which a user's credentials were used with an unfamiliar network context, such as an unknown geolocation or IP address, which may alert the user to unauthorized use of their credentials.

With reference to FIG. 8, this figure depicts a flowchart of an example process 800 for context-based content authorization in accordance with an illustrative embodiment. In a particular embodiment, the server 201 of FIG. 2, service infrastructure 500 of FIG. 5, or development environment 600 of FIG. 6 carries out the process 800.

At block 802, the process receives a network packet and extracts network layer information application layer information from within the network packet. Next, at block 804, the process determines a context of a network connection with a client device from which the network packet originated based at least in part on the network layer information. Next, at block 806, the process determines an identity of an end user with whom the network packet is associated based at least in part on the application layer information. Next, at block 808, the process performs a sign-on process that authenticates the identified end user and authorizes, at a session level, the identified end user to access a particular resource of the network. Next, at block 810, the process performs a program-level authorization process that determines whether to provide program-level authorization to the identified end user based on a comparison of the context of the network connection with a context policy of the particular resource of the network.

With reference to FIG. 9, this figure depicts a flowchart of an example process 900 for determining a context of a network connection in accordance with an illustrative embodiment. In a particular embodiment, process 900 is performed at block 804 of FIG. 8.

At block 902, the process evaluates an Internet protocol (IP) address extracted from network layer information. Next, at block 904, the process determines whether the IP address is a private IP address. If not, the process continues to block 906.

At block 906, the process identifies a geographical location associated with the IP address using a public data source. Next, at block 908, the process generates a generalization of the geographical location and network layer information. Next, at block 910, the process generates context data based at least in part on a generalization of geographical location and network layer information. Next, at block 912, the process deletes the network layer information.

If the process determines, at block 904, that the IP address is a private IP address, the process continues to block 914. At block 914, the process identify a geographical location associated with the private network address using private network information. Next, at block 916, the process generates context data based at least in part on geographical location associated with the private network address.

Figure 10:
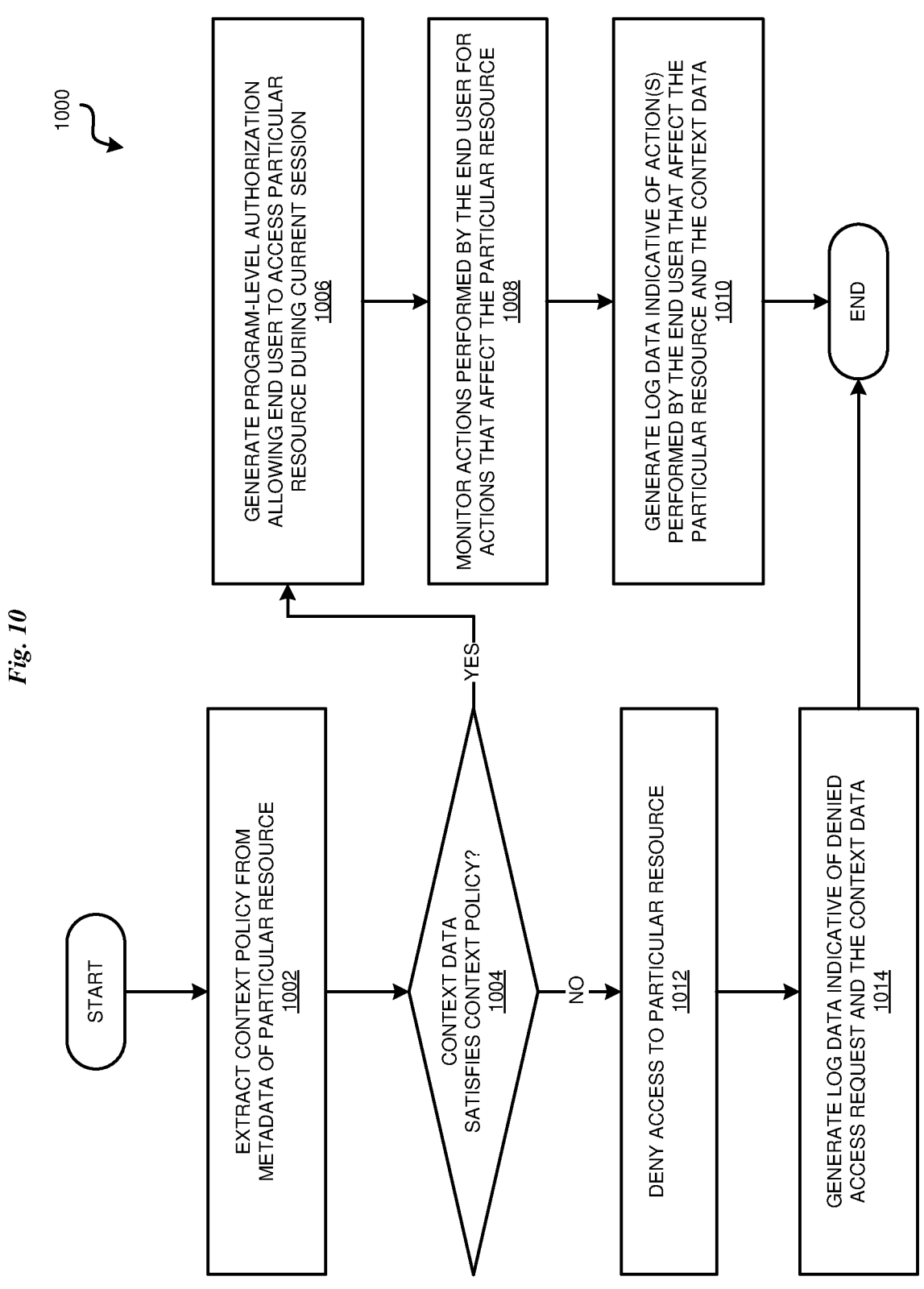
FIG. 10 depicts a flowchart of an example process for performing a program-level authorization process in accordance with an illustrative embodiment.

With reference to FIG. 10, this figure depicts a flowchart of an example process 1000 for performing a program-level authorization process in accordance with an illustrative embodiment. In a particular embodiment, process 1000 is performed at block 810 of FIG. 8.

At block 1002, the process extracts context policy from metadata of particular resource. Next, at block 1004, the process determines whether context data satisfies the context policy. If so, the process continues to block 1006.

At block 1006, the process generates a program-level authorization allowing the end user to access the particular resource during the current session. Next, at block 1008, the process monitors actions performed by the end user for actions that affect the particular resource. Next, at block 1010, the process generates log data indicative of action(s) performed by the end user that affect the particular resource and the context data.

If the process determines, at block 1004, that the context data does not satisfy the context policy, the process continues to block 1012. At block 1012, the process denies access to particular resource. Next, at block 1014, the process generates log data indicative of denied access request and the context data.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

extracting, by a network module, from a network packet received by the network module, network layer information from within the network packet and application layer information from within the network packet, the extracting comprising extracting an Internet Protocol (IP) address associated with a client device and obfuscating at least a portion of the IP address;

determining, based at least in part on the at least partially obfuscated IP address, a context of a network connection across a network with a client device from which the network packet originated based at least in part on the network layer information;

determining an identity of an end user with whom the network packet is associated based at least in part on the application layer information;

performing a sign-on process that authenticates the identified end user and authorizes, at a session level, the identified end user to access a particular resource of the network; and performing a program-level authorization process that determines whether to provide program-level authorization to the identified end user based on a comparison of the context of the network connection with a context policy of the particular resource of the network.

2. The computer-implemented method according to claim 1, wherein the determining of the context of the network connection with the client device further comprises determining a geographical location for the client device based at least in part on the IP address associated with the client device.

3. The computer-implemented method according to claim 2, wherein the determining of the context of the network connection with the client device further comprises detecting that the IP address is a private network address, wherein the determining of the geographical location comprises identifying the geographical location associated with the private network address.

4. The computer-implemented method according to claim 1, wherein the determining of the context of the network connection with the client device further comprises determining a group membership of the identified end user.

5. The computer-implemented method according to claim 1, wherein the determining of the context of the network connection comprises:

generating context data based at least in part on a generalization of the network layer information; and deleting the network layer information.

6. The computer-implemented method according to claim 5, wherein the performing of the program-level authorization process comprises comparing the context data with the context policy, wherein the method further comprises:

determining that the context data satisfies the context policy; and granting, responsive to determining that the context data satisfies the context policy, the end user with context authorization for the particular resource as the program-level authorization.

7. The computer-implemented method according to claim 6, further comprising:

establishing a communications session with the client device, wherein the establishing of the communications session comprises generating a session data structure that includes information about the communications session with the client device, wherein the granting of the context authorization comprises associating the context authorization with the session data structure.

8. The computer-implemented method according to claim 6, further comprising:

monitoring, responsive to granting the end user with the context authorization for the particular resource, actions performed by the end user that affect the particular resource.

9. The computer-implemented method according to claim 8, wherein the monitoring comprises generating log data that includes an action performed by the end user that affected the particular resource and further includes at least a portion of the context data.

10. A computer program product comprising one or more computer readable storage media, and program instructions collectively stored on the one or more computer readable storage media, the program instructions executable by a processor to cause the processor to perform operations comprising:

extracting, by a network module, from a network packet received by the network module, network layer information from within the network packet and application layer information from within the network packet, the extracting comprising extracting an Internet Protocol (IP) address associated with a client device and obfuscating at least a portion of the IP address;

determining, based at least in part on the at least partially obfuscated IP address, a context of a network connection across a network with a client device from which the network packet originated based at least in part on the network layer information;

determining an identity of an end user with whom the network packet is associated based at least in part on the application layer information;

performing a sign-on process that authenticates the identified end user and authorizes, at a session level, the identified end user to access a particular resource of the network; and performing a program-level authorization process that determines whether to provide program-level authorization to the identified end user based on a comparison of the context of the network connection with a context policy of the particular resource of the network.

11. The computer program product of claim 10, wherein the stored program instructions are stored in a computer readable storage device in a data processing system, and wherein the stored program instructions are transferred over a network from a remote data processing system.

12. The computer program product of claim 10, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

13. The computer program product of claim 10, wherein the determining of the context of the network connection with the client device further comprises determining a geographical location for the client device based at least in part on at least the portion of the IP address associated with the client device.

14. A computer system comprising a processor and one or more computer readable storage media, and program instructions collectively stored on the one or more computer readable storage media, the program instructions executable by the processor to cause the processor to perform operations comprising:

extracting, by a network module, from a network packet received by the network module, network layer information from within the network packet and application layer information from within the network packet, the extracting comprising extracting an Internet Protocol (IP) address associated with a client device and obfuscating at least a portion of the IP address;

determining, based at least in part on the at least partially obfuscated IP address, a context of a network connection across a network with a client device from which the network packet originated based at least in part on the network layer information;

determining an identity of an end user with whom the network packet is associated based at least in part on the application layer information;

performing a sign-on process that authenticates the identified end user and authorizes, at a session level, the identified end user to access a particular resource of the network; and performing a program-level authorization process that determines whether to provide program-level authorization to the identified end user based on a comparison of the context of the network connection with a context policy of the particular resource of the network.

* * * * *